United States Patent
Johnson

(10) Patent No.: US 7,525,217 B1
(45) Date of Patent: Apr. 28, 2009

(54) RECTIFIER-SUPER CAPACITOR DEVICE FOR USE IN A POWER SYSTEM FOR A TELECOMMUNICATION FACILITY

(75) Inventor: Larry L. Johnson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 428 days.

(21) Appl. No.: 10/648,973

(22) Filed: Aug. 27, 2003

Related U.S. Application Data

(63) Continuation-in-part of application No. 10/298,074, filed on Nov. 15, 2002, now Pat. No. 6,960,838.

(51) Int. Cl.
*H02J 9/00* (2006.01)
*H02B 13/00* (2006.01)

(52) U.S. Cl. .............. 307/64; 307/65; 307/81; 307/84; 307/86

(58) Field of Classification Search .............. 307/64
See application file for complete search history.

(56) References Cited

U.S. PATENT DOCUMENTS

| | | | |
|---|---|---|---|
| 4,915,435 A * | 4/1990 | Levine | 296/24.38 |
| 4,992,669 A * | 2/1991 | Parmley | 290/1 R |
| 5,737,202 A | 4/1998 | Shimamori | |
| 5,959,851 A * | 9/1999 | Shutts | 363/21.18 |
| 6,184,593 B1 * | 2/2001 | Jungreis | 307/64 |
| 6,215,202 B1 * | 4/2001 | Luongo et al. | 307/64 |
| 6,404,655 B1 * | 6/2002 | Welches | 363/41 |
| 6,421,261 B1 * | 7/2002 | Fujisawa et al. | 363/127 |
| 6,541,940 B1 * | 4/2003 | Jungreis | 320/103 |
| 6,553,770 B2 * | 4/2003 | Tisdale et al. | 60/772 |
| 6,666,123 B1 * | 12/2003 | Adams et al. | 89/6.5 |
| 6,902,837 B2 * | 6/2005 | McCluskey et al. | 429/9 |

* cited by examiner

*Primary Examiner*—Albert W. Paladini
*Assistant Examiner*—Adi Amrany

(57) ABSTRACT

The present invention is a device that includes a rectifier and a super capacitor packaged together in a single housing. The device has a first connection point that is coupled to the rectifier input. The output of the rectifier is coupled to a first side of the capacitor and to a second connection point of the device. The second side of the capacitor is coupled to ground through a third connection point. The device is operable to receive AC power and provide DC power. Moreover, through the operation of the super capacitor, the device will provide DC power for a time after AC power has been removed.

8 Claims, 3 Drawing Sheets

RECTIFIER-SUPER CAPACITOR DEVICE FOR USE IN A POWER SYSTEM FOR A TELECOMMUNICATION FACILITY

CROSS-REFERENCE TO RELATED APPLICATIONS

This application is a continuation-in-part of and claims priority pursuant to 35 U.S.C. Section 120 from U.S. application Ser. No. 10/298,074 filed Nov. 15, 2002 now U.S. Pat. No. 6,960,838.

STATEMENT REGARDING FEDERALLY SPONSORED RESEARCH OR DEVELOPMENT

Not applicable.

BACKGROUND OF THE INVENTION

In general, this invention provides an electronic device that includes a rectifier and a super capacitor. More specifically, this invention provides an electronic device having a super capacitor and a rectifier that is particularly adapted for use in a system that provides electrical power to a remote telecommunications facility.

Although it may be utilized in numerous applications, the present invention is specifically adapted for use in a system that provides power for the continuous operation of a remote telecommunications facility. With its core technology substantially composed of digital components, the telecommunications industry is heavily dependent on the continued supply of reliable electrical power. The critical nature of the functions performed by remote telecommunications facilities further emphasizes the need for a dependable power supply.

Most telecommunications facilities rely on a commercial power utility for electrical power and employ traditional devices, such as a transformer and switchgear, to safely receive and use the electrical power. In addition, to insure the facility's power supply is not interrupted, for example by a black-out or other disturbance in the commercial power grid, many telecommunications facilities have a system for providing backup power. Although various designs are used, many backup systems employ a diesel generator and an array of batteries. If power from the commercial utility is lost, the diesel generator takes over to supply power, and the battery array insures that power is maintained during the time it takes to switch from utility-supplied power to generator-supplied power. If the generator also fails, such as due to a mechanical malfunction or to the depletion of its fuel source, then the battery array is able to provide power for an additional period of time.

There are several disadvantages inherent in the current manner in which power is supplied to telecommunications facilities. First, the cost of local electrical utility service has risen dramatically in recent years and, by all accounts, will continue to rise. Thus, the cost of local electrical utility power is a large component of the facility's overall power expenses. Next, as the facility's power demands have increased, the number of batteries required to provide an adequate amount of power for a reasonable period of time has also increased. Clearly, the component cost of the system increases with the greater number of batteries required. In addition, with more batteries required, the space required to house the backup system has significantly increased, which has increased the spatial cost of the systems. Finally, it is known that generators suffer from certain reliability problems, such as failing to start when needed because of disuse or failed maintenance. Therefore, the reliability of the backup systems could be improved.

The power system presented below overcomes these disadvantages by providing reliable electrical power that is not dependent on a commercial electrical utility and that does not employ an array of batteries. The system, therefore, is more cost efficient and requires less space than the present manner of providing power to facilities. The invention employs redundant sources of power, and thus, is uninterruptible. Also, the system employs power generating components that have less of an impact on the environment than the current manner in which power is supplied. Moreover, the system may be constructed at a manufacturing site and then moved to the facility. Thus, the system provides power to a telecommunications facility in a manner that is less expensive, that requires less space, that is movable, and that is environmentally friendly.

SUMMARY OF THE INVENTION

The present invention includes a rectifier and a super capacitor that are packaged together in a single housing. The device has a first connection point that is coupled to the rectifier input. The output of the rectifier is coupled to a first side of the capacitor and to a second connection point of the device. The second side of the capacitor is coupled to ground through a third connection point. The device is operable to receive AC power and provide DC power. Moreover, through the operation of the super capacitor, the device will provide DC power for a time after AC power has been removed.

The present invention is intended for use in a power system that is designed to provide reliable electrical power to a facility, and specifically to a telecommunications facility. One such power system includes a number of microturbine generators adapted to provide AC power. The system is configured so that the microturbine generators are fueled initially by natural gas supplied by a commercial utility. In the event the natural gas supply fails, the system includes a propane storage tank to provide fuel to the microturbine generators. If the microturbines are unable to provide adequate power to the facility, then the system provides power received from a commercial electrical utility. The system also includes a number of proton exchange membranes adapted to convert a fuel such as hydrogen to DC electrical power and operable to supply DC electrical power directly to the facility. The present invention may be utilized to convert the AC power from the microturbine generators or commercial utility to DC power and to maintain the power level while the system switches between sources.

BRIEF DESCRIPTION OF THE SEVERAL VIEWS OF THE DRAWINGS

The present invention is described in detail below with reference to the attached figure, wherein.

DETAILED DESCRIPTION OF THE INVENTION

The present invention includes a device adapted for use in a power system, and specifically for use in a telecommunications facility power system. The device contains both a rectifier and a super capacitor in the same housing and is operable to convert AC power to DC power and to provide power while the system switches between fuel sources and/or power sources. The system provides redundant sources of electrical power including a number of microturbine generators and a number of proton exchange membranes (PEMs). The system avoids the need for an array of batteries and is more cost efficient than the current method for providing power to telecommunications facilities.

Figure 1:
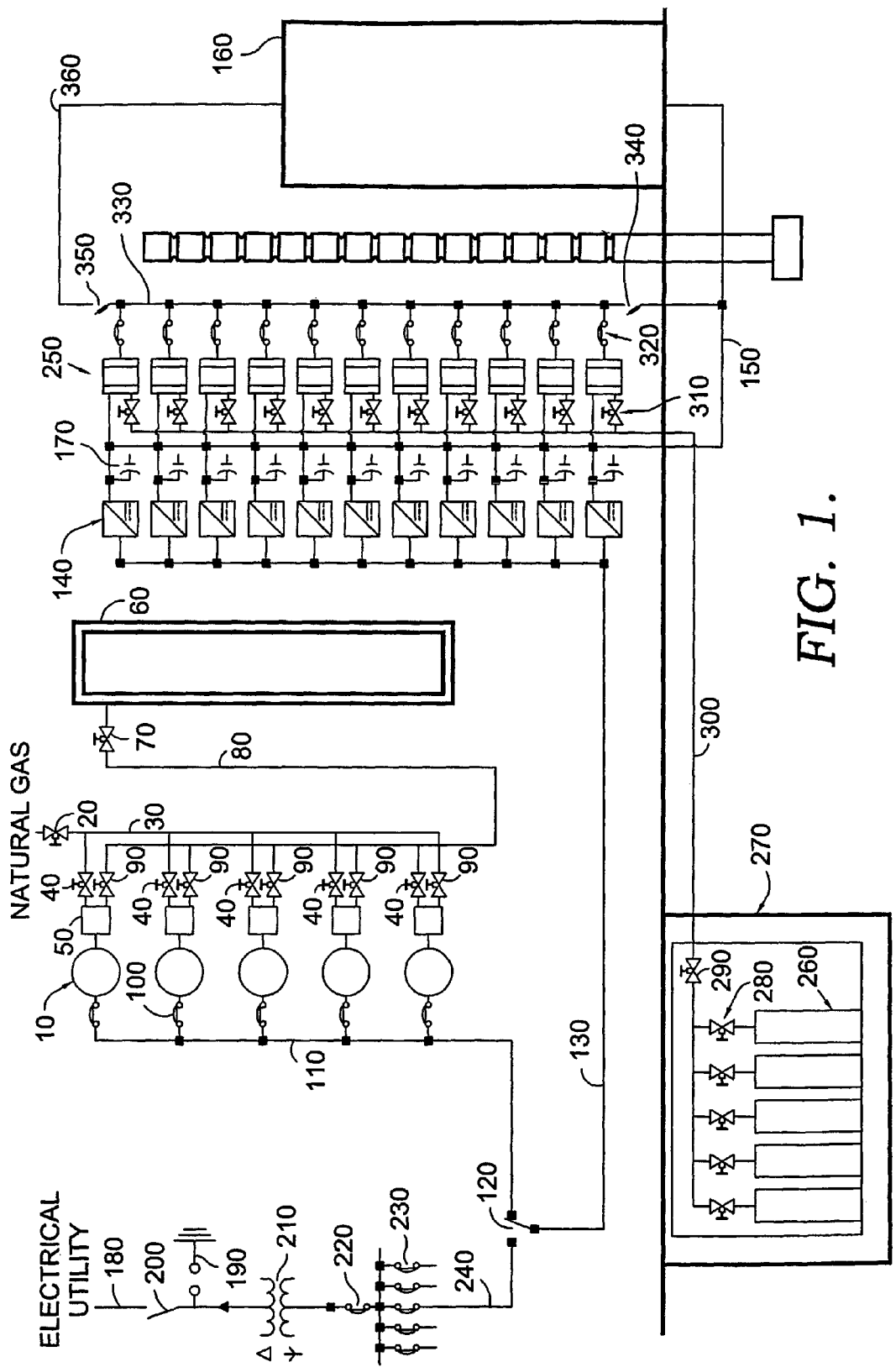
FIG. 1 is a schematic diagram of a power system in which the present invention may be utilized.

The present invention may be understood in connection with the schematic diagrams of FIGS. 1-4. In FIG. 1, one embodiment of a power system initially comprises a number of microturbine generators 10. Generally, a turbine includes a rotary engine that is actuated by the reaction or impulse or both of a current of fluid, such as air or steam, subject to pressure, and an electric generator that utilizes the rotation of the engine to produce electrical power. Microturbine generators are a recently developed technology and have not been employed to provide power to a telecommunications facility. A microturbine is smaller and more compact than more common turbines and creates a lower amount of harmful emissions than both more common turbines and diesel generators. A microturbine generator includes a system for receiving fuel, a microturbine for converting the fuel received to electrical power and a digital power controller. Thus, a microturbine generator is able to utilize a fuel source such as natural gas or propane to produce electrical power. One microturbine generator that is suitable for the power system is the Capstone 60 MicroTurbine™ system produced by the Capstone Turbine Corporation of Chatsworth, Calif. As is understood by those in the art, the number of microturbine generators used in the power system depends on the amount of power required by the destination facility.

The power system is designed to provide fuel to microturbine generators 10 from two different sources. Initially, microturbine generators 10 are fueled by natural gas provided by a commercial utility. The natural gas is received in primary fuel valve 20, which is coupled to primary fuel pipe or line 30. Pipe 30 is also coupled to a series of valves 40, and each of valves 40 is also coupled to an input of a corresponding mixing box 50. The output of mixing boxes 50 is coupled to the input of one of microturbine generators 10. Microturbine generators 10 may also be powered by propane stored in a local storage tank 60. The propane is received through backup fuel valve 70, which is coupled to backup fuel pipe or line 80. Pipe 80 is also coupled to a series of valves 90, and each of valves 90 is coupled to an input of mixing boxes 50.

Mixing boxes 50 are operable to combine fuel received with any necessary additional components and, thereafter, provide appropriate amounts of fuel to microturbine generators 10. Mixing boxes 50 are capable of receiving and responding to a control signal by at least opening or closing lines from valves 40 and 90. In addition, valves 20, 40, 70 and 90 are also capable of receiving and responding to a control signal by at least opening and closing.

Microturbine generators 10 utilize the natural gas or propane fuel received from mixing boxes 50 to produce AC electrical power. The output electrical current from each microturbine generator 10 is coupled to one end of a circuit breaker 100 in order to protect the circuit from, for example, a power surge. The opposite end of circuit breakers 100 is coupled to a bus line 110.

The power system is also capable of receiving power from a commercial utility. Utility-supplied power is received on bus line 180, and a connection to ground is provided through line 190. Bus line 180 is connected to one side of switch 200, and the other side of switch 200 is coupled to the primary side of transformer 210. As is known, a transformer is capable of receiving an input signal on its primary side and producing a corresponding signal on its secondary side that is electronically isolated from the input signal. The secondary side of transformer 210 is coupled to one side of a main circuit breaker 220. The opposite side of main circuit breaker 220 is coupled to one side of a number of circuit breakers 230. The opposite side of one of the circuit breakers 230 is connected to bus line 240; the remaining circuit breakers 230 are available to provide electrical power for additional applications or systems.

Switch 120 is operable to switch between microturbine-produced power and power supplied by the commercial utility. Thus, bus line 110 and bus line 240 are coupled to opposing sides of switch 120. Bus line 130 is coupled to the output of switch 120.

Bus line 130 is also coupled to a number of rectifiers 140. Rectifiers 140 are operable to receive an AC input and rectify or convert that input to produce a DC output. Thus, rectifiers 140 convert the microturbine- or utility-provided AC power to DC power. The output of rectifiers 140 is coupled to bus line 150, which is connected to the power distribution unit 160 in the destination facility. A number of super capacitors 170 are also connected to bus line 150.

Figure 4:
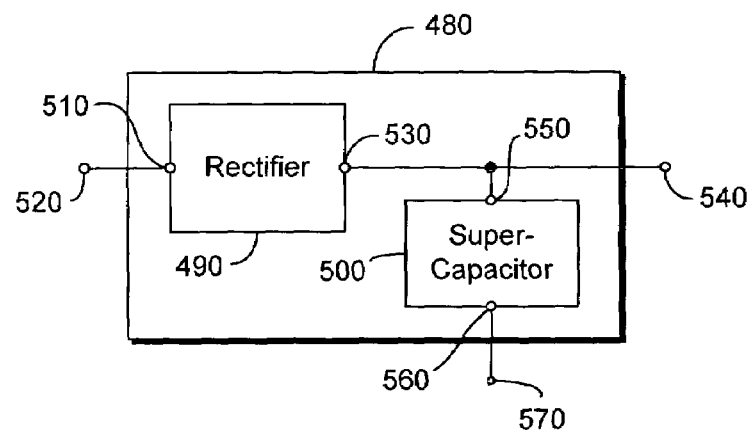
FIG. 4 is a block diagram of one embodiment of the present invention.

Referring to FIG. 4, in another embodiment, the power system utilizes a number of devices 480 instead of a number of individual rectifiers and a number of individual super capacitors. Device 480 includes a rectifier 490 and a super capacitor 500 together in one housing. The input 510 for rectifier 490 is coupled to one connection point 520 of device 480, while the output 530 of rectifier 490 is coupled to a second connection point 540. A first side 550 of super capacitor 500 is also coupled to second connection point 540. The second side 560 of super capacitor 500 is coupled to a third connection point 570. It should be understood that connection points 520, 540 and 570 are any suitable connectors including, but not limited to, screw-type or plug-in connectors. When utilized in the power system of FIG. 1, connection point 520 is coupled to bus line 130, connection point 540 is coupled to bus line 150 and connection point 570 is coupled to ground.

Returning to FIG. 1, power distribution unit 160 contains connections into the telecommunications facility's power lines, and/or provides connections to the various telecommunications equipment. Power distribution unit 160 may also contain additional circuit breakers or other power switchgear or safety devices and/or circuits, including circuits to limit the voltage or current provided to the facility's power lines, and monitoring/measuring equipment.

Continuing with FIG. 1, the power system also includes a number of proton exchange membrane fuel cell modules (PEMs) 250. A PEM is a device that is capable of converting dry gaseous hydrogen fuel and oxygen in a non-combustive electrochemical reaction to generate DC electrical power. Because the only by-products of this reaction are heat and water, a PEM is friendly to the environment and may be used indoors and in other locations where it is not possible to use a conventional internal combustion engine. In addition, unlike a battery, a PEM is capable of providing electrical power for as long as fuel is supplied to the unit. One PEM that is suitable for the power system is the Nexa™ power module manufactured by Ballard Power Systems Inc. of Burnaby, British Columbia, Canada. As with microturbine generators 10, the number of PEMs 250 required is dependent on the amount of power required by the destination facility.

Hydrogen fuel is supplied to the PEMs 250 from a number of storage tanks 260 located in a vault 270. Each of the storage tanks 260 is coupled to a valve 280. Each of valves 280 is coupled to a valve 290 which is also coupled to a pipe 300. Thereafter, pipe 300 is coupled to a series of valves 310, and each of valves 310 is coupled to one of the PEMs 250. The output of the PEMs 250 is connected between bus line 150 and a circuit breaker 320. As stated above, super capacitors 170 and the power distribution unit 160 of the facility are also connected to bus line 150. The other side of circuit breakers 320 is connected to a bus line 330. There are two switches connected to bus line 330. Switch 340 is coupled to bus line 330 on one side and bus line 150 on the other side. Switch 350 is coupled to bus line 330 on one side and bus line 360 on the other side. Unlike bus line 150, bus line 360 is only connected to power distribution unit 160 of the facility.

The power system also comprises a number of sensing and control mechanisms (not expressly shown) for determining which fuel source to activate and which power source to engage. As is known, the sensing mechanisms may be separate devices or may be integral to the valves, bus lines, and/or devices being monitored. Likewise, the control mechanism may be a separate device, such as a programmable logic controller, or may be part of one of the components already described, such as the microturbine generators 10. It is also possible that the sensing and control mechanisms may be combined into a solitary mechanism that may be a stand-alone unit or may be combined with one of the components already described.

Figure 2A:
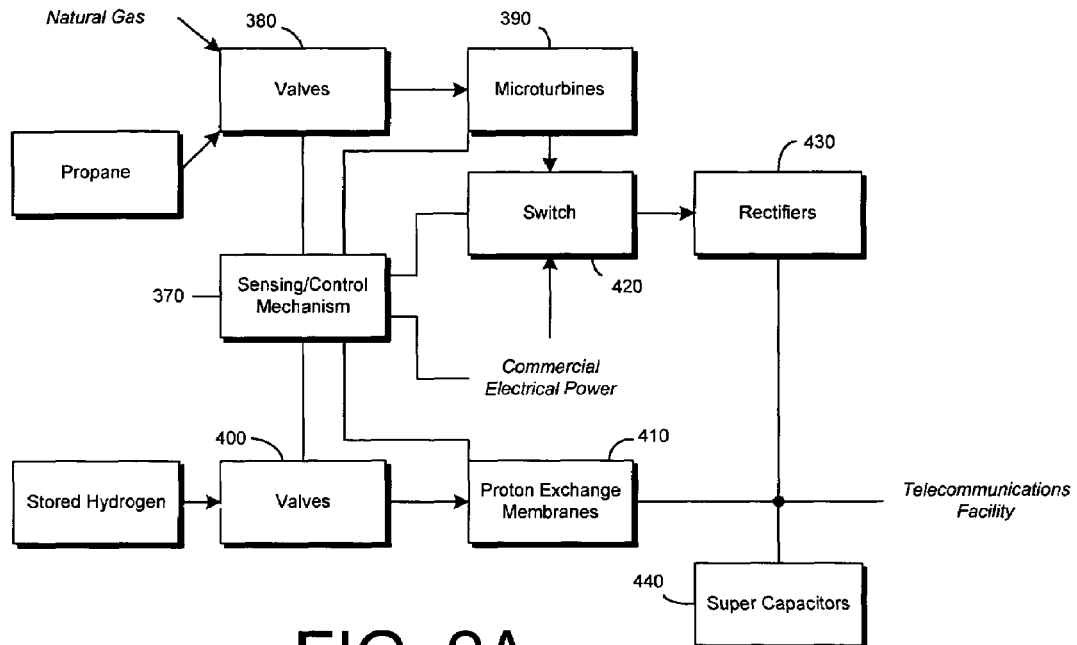
FIG. 2A is a functional block diagram of the major components of the power system of FIG. 1.
Figure 2B:
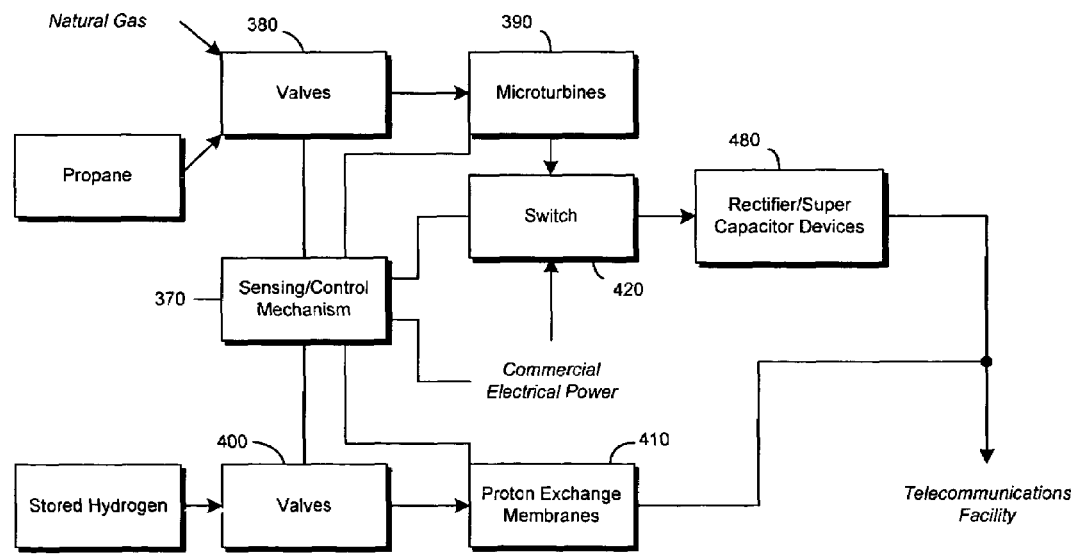
FIG. 2B is a functional block diagram of the major components of the power system of FIG. 1 including one embodiment of the present invention.

The operation of the power system may be understood by referring to FIGS. 2A and 2B. It should be noted that the power system is represented in FIGS. 2A and 2B by functional blocks. Thus, sensing/control mechanism 370 is shown as one unit when in fact the sensing and control devices actually may be several devices as discussed previously. Of course, all of the sensing and control devices actually may be placed together in a separate unit, such as a programmable logic controller, as shown in FIGS. 2A and 2B.

Referring first to FIG. 2A, in one method of operation, sensing/control mechanism 370 initially causes valves 380 (which include valves 40 and 90 shown in FIG. 1) to allow natural gas to flow from the utility source to the microturbine generators 390 and to prevent the flow of propane to microturbine generators 390. Sensing/control mechanism 370 also initiates operation of the microturbine generators 390. In addition, sensing/control mechanism 370 also causes valves 400 (which include valves 310 shown in FIG. 1) to prevent the flow of hydrogen to the PEMs 410 and causes the PEMs 410 to remain off. In this manner, microturbine generators 390 produce AC power using utility-supplied natural gas. The AC current produced by the microturbine generators passes through switch 420 to rectifiers 430 where it is converted to DC current. Thereafter, the DC current from rectifiers 430 is provided to the telecommunications facility and to super capacitors 440. As is well known, when they first receive DC current, super capacitors 440 charge to the level of the DC power provided.

If sensing/control mechanism 370 determines that there is an interruption in the utility-supplied natural gas, then it will cause valves 380 to prevent the flow of natural gas and allow the flow of hydrogen to microturbine generators 390. Switch 420 remains in the same position as before and valves 400 continue to prevent the flow of hydrogen to PEMs 410. In this configuration, microturbine generators 390 continue to generate AC power but now their fuel is propane.

If the sensing/control mechanism 370 determines that both fuel sources for microturbine generators 390 have failed or that there is some other disturbance in the microturbine-supplied power which causes that power to become inadequate, then sensing/control mechanism 370 will cause valves 380 to close and deactivate the microturbine generators 390. Sensing/control mechanism 370 will set switch 420 so that rectifiers 430 receive AC power from the electric utility. In addition, sensing/control mechanism 370 will keep valves 400 closed and PEMs 410 deactivated.

If sensing/control mechanism 370 determines that the electric utility has failed or the power it supplies has become inadequate and the microturbine generators 390 remain deactivated, such as due to a lack of fuel or a malfunction, then sensing/control mechanism 370 will cause valves 400 to open which allows hydrogen to flow to PEMs 410. Thereafter, the control mechanism will activate PEMs 410. In this manner the PEMs 410 provides DC power to the telecommunications facility and to super capacitors 440.

In each of the above scenarios, super capacitors 440 provide electrical power during the time it takes for the control mechanism to switch from one power source to another. Thus, super capacitor 440 must have a discharge time greater than the longest time required to switch between power sources. One super capacitor that is suitable for this invention is manufactured by Maxwell Technologies located in San Diego, Calif.

In another method of operation, PEMs 410 are the primary source of power. In this method, power is supplied temporarily by either a commercial electrical utility or microturbines 390 while the output of PEMs 410 rises to acceptable levels, which should be understood to be 48 volts DC and/or 200 amps DC. When the output of PEMs 410 has risen to those levels, then power from either the commercial electrical utility or microturbines 390 is discontinued.

Thus, in this method of operation, sensing/control mechanism 370 initially causes switch 420 to allow AC power to flow from the commercial electrical utility or microturbines 390 to rectifiers 430 where the AC power is converted to DC power. Thereafter, the DC power from rectifiers 430 is provided to the telecommunications facility and to super capacitors 440.

While power is provided by the commercial electrical utility or microturbines 390, sensing/control mechanism 370 initiates operation of PEMs 410 by causing valves 400 to open which allows hydrogen to flow to PEMs 410. Thereafter, sensing/control mechanism 370 monitors the operation of PEMs 410 to determine when the output rises to an acceptable level. When PEMs 410 are prepared to provide an output having an acceptable level, sensing/control mechanism 370 causes switch 420 to open thereby discontinuing the flow of electricity from either the commercial utility or microturbines 390 and causes PEMs to output DC power to the telecommunications facility. It should be understood that power is supplied by supercapitors 440 during the time required to switch from commercial utility or microturbine-supplied power to PEM-supplied power.

In FIG. 2B, rectifiers 430 and super capacitors 440 have been replaced with rectifier/super capacitor devices 480. Thus, switch 420 is coupled to devices 480 so that the AC power will flow through switch 420 from microturbines 390 or commercial utility power depending on sensing/control mechanism 370. Switch 420 is coupled to control point 520 shown in FIG. 4. The output of PEMs 410 is also coupled to devices 480 at connection point 540 shown in FIG. 4 so when PEMs 410 are in operation their DC power output will charge the super capacitors within devices 480. Finally, devices 480, and specifically connection point 540 shown in FIG. 4, are coupled to the telecommunications facility.

Figure 3:
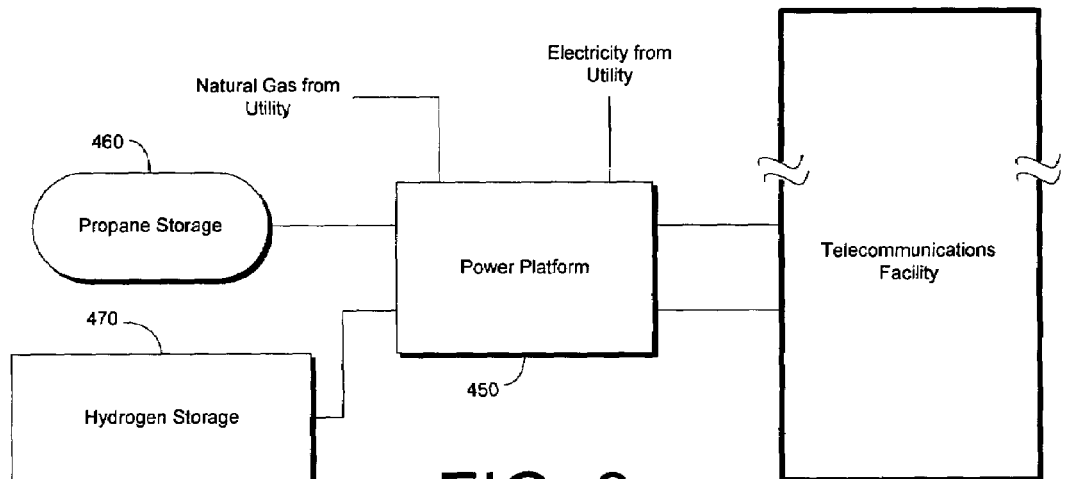
FIG. 3 is a block diagram showing the physical relationship of the power system of FIGS. 1-2B.

Referring now to FIG. 3, significant portions of the present invention may be enclosed in a modular, weatherproof container, indicated by the numeral 450, that is transportable by truck or rail. For example, all of the components shown in FIG. 1, except tank 60 and vault 270 with the components contained therein, may be pre-assembled and pre-wired with the sensing/control mechanism(s) and then placed in container 450 before being shipped to a facility. Once at the facility, propane storage tank 460 and hydrogen storage vault 470 are provided and coupled to container 450. Once utility-supplied natural gas and electricity lines have been coupled to container 450 and the output of container 450 is coupled to the telecommunications facility 480, then the unit may be activated.

As discussed, in one method of operation, the power system described above initially employs microturbine generators to provide electrical power for a telecommunications facility. The microturbine generators are compact, efficient (both in terms of space and fuel) and reliable. By relying on microturbine generators as the main source of power, the system avoids both the reliability problems and environmental hazards inherent in internal combustion generators and the costs and environmental concerns associated with commercial electrical power. The power system also provides redundant sources of power, specifically from a commercial electrical utility and a number of PEMs, and, therefore, is uninterruptible. Finally, the system provides a number of super capacitors (either individually or integral to a like number or rectifier/super capacitor devices) to provide electrical power during the time it takes to switch between power sources. By employing super capacitors and proton exchange membranes, the power system avoids the use of batteries thereby saving significant cost and space. Moreover, the system may operate so that the PEMs are the primary source of power with power from the commercial electrical utility or the microturbines providing power during the time required for the output of the PEMs to rise to acceptable levels.

It will be appreciated by persons skilled in the art that the present invention is not limited to what has been particularly shown and described hereinabove. Rather, all matter shown in the accompanying drawings or described hereinabove is to be interpreted as illustrative and not limiting. Accordingly, the scope of the present invention is defined by the appended claims rather than the foregoing description.

What is claimed is:

1. A power supply system for providing reliable electrical power to a telecommunications facility, said facility containing telecommunications equipment, said system comprising:
   an AC power source;
   a plurality of individual rectifier/super capacitor devices, each device including a rectifier and a super capacitor packaged together in a housing, wherein the rectifier is operable to convert said AC electrical power to DC electrical power adaptable to power said telecommunication equipment;
   a DC power source including one or more proton exchange membrane fuel cell modules receiving hydrogen fuel from storage tanks, said DC power source selectively powering said telecommunication equipment based on an interruption of AC power being provided by the AC power source;
   wherein each of said individual rectifier/super capacitor devices includes a first, a second, and a third connection point, the first connection point internally couples the rectifier to the AC power source, the second connection point internally couples the rectifier to a first side of said super capacitor and to the telecommunication equipment for providing DC power thereto, and the third connection point internally couples a second side of said super capacitor to ground;
   wherein said AC power source comprises at least one microturbine generator operable to produce AC electrical power and adapted to be powered by a fuel;
   a first switching mechanism operable either to couple said at least one microturbine generator to said first connection point or to couple a commercial electric utility to said first connection point;
   a sensing/control mechanism operable to determine when inadequate flow of the fuel is realized by said at least one microturbine generator, and in response, direct the operation of the first switching mechanism to selectively couple said commercial electric utility to said first connection point, wherein the super capacitor is further configured as a power source to provide DC power to the telecommunication equipment when the first switching mechanism selectively couples said first connection point from said AC power source to said commercial electric utility, such that the DC power provided to the telecommunication equipment is uninterrupted; and
   a modular container for enclosing the plurality of individual rectifier/super capacitor devices pre-wired in parallel, the AC source, the DC source, and the first switching mechanism preassembled with sensing/control mechanism, wherein the modular container is capable of being transported to the telecommunications facility and coupled with the telecommunications equipment contained therein.

2. The system of claim 1 wherein said fuel for said at least one microturbine generator is natural gas, the system further comprising a first valve to couple a source of the natural gas to the at least one microturbine generator in fluid communication.

3. The system of claim 2 wherein said natural gas is supplied by a commercial utility.

4. The system of claim 1 wherein said fuel for said at least one microturbine generator is propane, the system further comprising a second valve to couple a source of the propane to the at least one microturbine generator in fluid communication, wherein the sensing/control mechanism is operable to determine when inadequate flow of the natural gas is realized by said at least one microturbine generator, and in response, direct the operation of the first valve to prevent flow from the source of the natural gas to the at least one microturbine generator and concurrently direct the operation of the second valve to allow flow from the source of the propane to the at least one microturbine generator.

5. The system of claim 4 wherein said source of propane and the storage tanks of the hydrogen fuel are stored on a site of the telecommunications facility, and wherein the source of propane, the source of natural gas, and the storage tanks are coupled to the modular container upon being transported to the telecommunications facility.

6. The system of claim 1 wherein said AC power source further comprises at least one commercial electric utility.

7. The system of claim 6 wherein the sensing/control mechanism is configured to initially selectively couple the at least one microturbine generator to the telecommunication equipment, via the plurality of individual rectifier/super capacitor devices pre-wired in parallel, to secondly selectively couple the commercial electric utility to the telecommunication equipment, via the plurality of individual rectifier/super capacitor devices pre-wired in parallel, upon sensing a disruption from the at least one microturbine generator, and to thirdly selectively couple the one or more proton exchange membrane fuel cell modules to the telecommunication equipment directly upon sensing a disruption at the commercial electric utility.

8. The system of claim 1 wherein the sensing/control mechanism is configured to initially activate and selectively couple the one or more proton exchange membrane fuel cell modules to the telecommunication equipment, thereby acting as a primary source of power, and to temporarily, selectively couple the at least one microturbine generator to the telecommunication equipment in concurrence with the activation of the one or more proton exchange membrane fuel cell modules until an output thereof rises to a predefined level.

* * * * *